United States Patent
Dopona

(10) Patent No.: US 6,418,890 B1
(45) Date of Patent: Jul. 16, 2002

(54) CONTROL ASSEMBLY FOR EXHAUST TIMING CONTROL

(75) Inventor: Michael Dopona, Sipbachzellerstrasse (AT)

(73) Assignee: Bombardier-Rotax GmbH, Gunskirchen (AT)

( * ) Notice: Subject to any disclaimer, the term of this patent is extended or adjusted under 35 U.S.C. 154(b) by 0 days.

(21) Appl. No.: 09/699,406

(22) Filed: Oct. 31, 2000

Related U.S. Application Data

(60) Provisional application No. 60/232,610, filed on Sep. 14, 2000.

(30) Foreign Application Priority Data

Nov. 5, 1999 (AT) .............................................. 766/99 U

(51) Int. Cl.[7] ................................................ F02B 75/02
(52) U.S. Cl. .................................................. 123/65 PE
(58) Field of Search ............................ 123/65 PE, 65 P

(56) References Cited

U.S. PATENT DOCUMENTS

| | | | | |
|---|---|---|---|---|
| 4,364,346 A | * | 12/1982 | Shiohara | 123/65 PE |
| 5,588,402 A | * | 12/1996 | Lawrence | 123/65 PE |
| 5,873,334 A | * | 2/1999 | Heinrich | 123/65 PE |
| 6,021,748 A | * | 2/2000 | Motose | 123/65 PE |
| 6,158,215 A | * | 12/2000 | Bosch et al. | 123/65 PE |
| 6,189,494 B1 | * | 2/2001 | Nagumo et al. | 123/65 PE |
| 6,216,648 B1 | * | 4/2001 | Spaulding | 123/65 PE |
| 6,244,227 B1 | * | 6/2001 | Matte | 123/65 PE |

* cited by examiner

Primary Examiner—Marguerite McMahon
(74) Attorney, Agent, or Firm—Pillsbury Winthrop LLP

(57) ABSTRACT

An arrangement for exhaust timing control by controlling the effective height of an exhaust port of a cylinder of a two-cycle internal combustion engine and comprising a control valve assembly arranged in a guide channel so as to be displaceable relative to the exhaust port and having an associated operating assembly for shifting thereof, the control valve assembly, in its advanced position, decreases the height of the exhaust port and, in its retracted position, exposes the entire cross-section of the exhaust port; a seal effective between the guide and the control valve assembly is provided in the end region of the control valve assembly facing the exhaust port.

43 Claims, 4 Drawing Sheets

CONTROL ASSEMBLY FOR EXHAUST TIMING CONTROL

CROSS REFERENCE TO RELATED APPLICATION

This application relates to and claims priority under 35 USC § 119 on Austrian Patent Application No. GM 766/99, filed on Nov. 5, 1999 and U.S. Provisional Application No. 60/232,610, filed on Sep. 14, 2000, both of which are incorporated by reference herein.

FIELD OF THE INVENTION

The present invention relates to a control assembly for exhaust timing control. In particular, the present invention relates to a control assembly for controlling the effective height of an exhaust port of a cylinder of a two-cycle internal combustion engine.

BACKGROUND OF THE INVENTION

Various arrangements for controlling exhaust timing are known. For example, U.S. Pat. No. 4,121,552, entitled "Exhaust Means For Two Cycle Engines" to Mithuo et al. and U.S. Pat. No. 4,333,431, entitled "Water-Cooled Two Stroke Engine Having Exhaust Port Timing Control Valve Means" to Iio et al. disclose arrangements for controlling exhaust timing. These arrangements increase engine torque particularly in lower and middle r.p.m. ranges. Additional control arrangements are disclosed in AT 369 866 B, which corresponds to U.S. Pat. No. 4,399,788, entitled "Internal Combustion Engine Comprising Means for Controlling The Axial Extent of An Exhaust Port in a Cylinder" to Bostelmann, and U.S. Pat. No. 4,364,346, entitled "Exhaust Timing Control Device for a Two-Cycle Engine" to Shiohara. These arrangements include a plate-shaped control valve assembly that is shiftable in position relative to the exhaust port by a pressurized membrane, which acts as an adjustment assembly. In an advanced position, the control valve assembly exposes only a portion of the exhaust port of the cylinder. In a retracted position, the exhaust port is fully exposed. Exhaust gas pressure or overpressure in the crankcase is used to operate the pressurized membrane.

Over the years, these arrangements have to be proven successful when used in connection with carburetor engines. When used in two-cycle engines with fuel injection, in particular with direct injection, however, numerous problems exist. Due to the incomplete combustion of fuel particles and additionally effective crack processes, oil carbon or soot-like deposits form on the surface of the control valve assembly. These deposits also form on the walls of the guide. These deposits can have a lasting detrimental effect on the function of the slide valve. In particular, the axial movement of the slide valve is inhibited, which can reduce engine performance.

OBJECTS OF THE INVENTION

It is an object of the present invention to provide a control assembly for exhaust timing control that eliminates the problems identified in the above-identified prior art.

It is another object of the present invention to provide a control assembly for exhaust timing control having a sealing arrangement that protects the control assembly from deposits of incompletely burnt fuel particles and the like to provide undisturbed long-term operation.

It is another object of the present invention to provide a control assembly that is pneumatically operated for improved operating performance.

It is another object of the present invention to provide a control assembly having means for removing y particles that may form on the control valve assembly during operation.

The foregoing and other objects, features, characteristics and advantages of the present invention as well as the methods of operation and functions of the related elements of structure, and the combination of parts and economies of manufacture, will be apparent from the following detailed description and the appended claims, taken in connection with the accompanying drawings, all of which form a part of the specification.

SUMMARY OF THE INVENTION

In response to the foregoing challenges, applicants have developed an innovative control assembly for exhaust timing control. The present invention is directed to a control assembly for exhaust timing control in a two-cycle internal combustion engine. The two-cycle internal combustion engine includes a housing and has at least one cylinder. Each cylinder has an exhaust port with an effective height, which is in communication with an exhaust channel. In accordance with the present invention, the control assembly includes a control valve assembly for modifying the effective height of the exhaust port, a guide channel formed in the housing, an operating assembly for moving the control valve assembly within guide channel between a retracted position and an extended position, and a sealing arrangement between the control valve assembly and the guide channel.

In accordance with the present invention, the guide channel is formed in the housing of the internal combustion engine. When the control valve assembly is in the extended position, the effective height of the exhaust port is reduced. The control valve assembly extends into the exhaust channel adjacent the exhaust port when in the extended position.

In accordance with the present invention, the sealing arrangement is located on at least one of the control valve assembly and the guide channel. The sealing arrangement may include a chamfer formed in the control valve assembly and a complementary chamfer formed in at least a portion of the guide channel. The chamfer being adapted to sealingly engage the complementary chamfer when the control valve assembly is in the extended position. The sealing arrangement may further include a first sealing surface on the control valve assembly, and a second sealing surface on he guide channel opposite the first sealing surface. The first sealing surface is adapted to be pressed against the second sealing surface when the chamfer contacts the complementary chamfer. The operating assembly may supply the necessary force to press the first sealing surface against the second sealing surface. In this particularly advantageous arrangement, the chamfer is present on one side of the guide channel. The control valve assembly, in the extended position being sealingly pressed against the opposite wall of the guide channel. With this configuration, not only the sealing against penetration of solid particles is achieved, but improved heat conduction away from the control valve assembly becomes possible.

The sealing arrangement may include at least one gasket located on the control valve assembly. The sealing arrangement may include an area of contact between the control valve assembly and the guide channel. It is contemplated that the above-described sealing arrangements may be used alone or in combination.

The sealing arrangement is positioned to be effective between the guide channel and the control valve assembly in an end region of the control valve facing the exhaust port.

With such an arrangement, a penetration of depositing particles between control valve assembly and guide channel, primarily in the advanced position of the control valve assembly, in which particularly large amounts of such particles would deposit, can be prevented in a simple, yet efficient manner.

In accordance with the present invention, at least one stop may be provided to limit the axial movement of the control valve assembly. A first stop may limit the movement of the control valve assembly to the retracted position. A second stop may limit the movement of the control valve assembly to the extended position.

To effect additional sealing of the control valve assembly in the guide channel relative to exhaust gas admixed with incompletely burnt depositing particles flowing in from the exhaust port, and to additionally define the advanced position of the control valve assembly, it is furthermore advantageous if the control valve assembly has an enlarged cross-sectional portion at a distance from its end facing the exhaust port, this enlarged cross-sectional portion abutting against a separate stop of the guide in the advanced position of the control valve assembly.

In accordance with the present invention, the operating assembly includes a spring assembly for biasing the control valve assembly into the extended position. The operating assembly may further include a selectively operable piston assembly for moving the control valve assembly from the extended position to the retracted position against the bias of the spring assembly, a selectively operable supply of compressed air for operating the piston assembly, and an engine management system for selectively operating the supply of compressed air. Since additional resisting forces occur as a consequence of scraping off of deposits and the frictional forces caused due to the seal between the control valve assembly and the guide channel, it is advantageous that the control valve assembly be pneumatically actuated by compressed air from a combustion air compressor.

BRIEF DESCRIPTION OF THE DRAWINGS

The invention will be described in conjunction with the following drawings in which like reference numerals designate like elements and wherein.

DETAILED DESCRIPTION OF THE INVENTION

Figure 2:
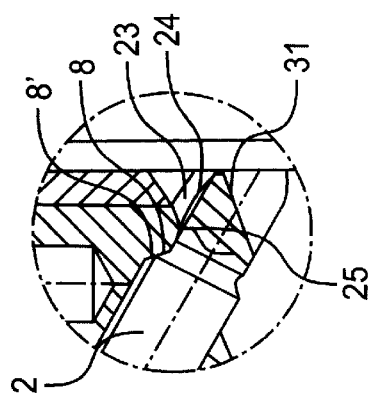
FIG. 2 is an enlarged cross-sectional view within the circle II of an end of the control assembly adjacent the exhaust port.
Figure 1:
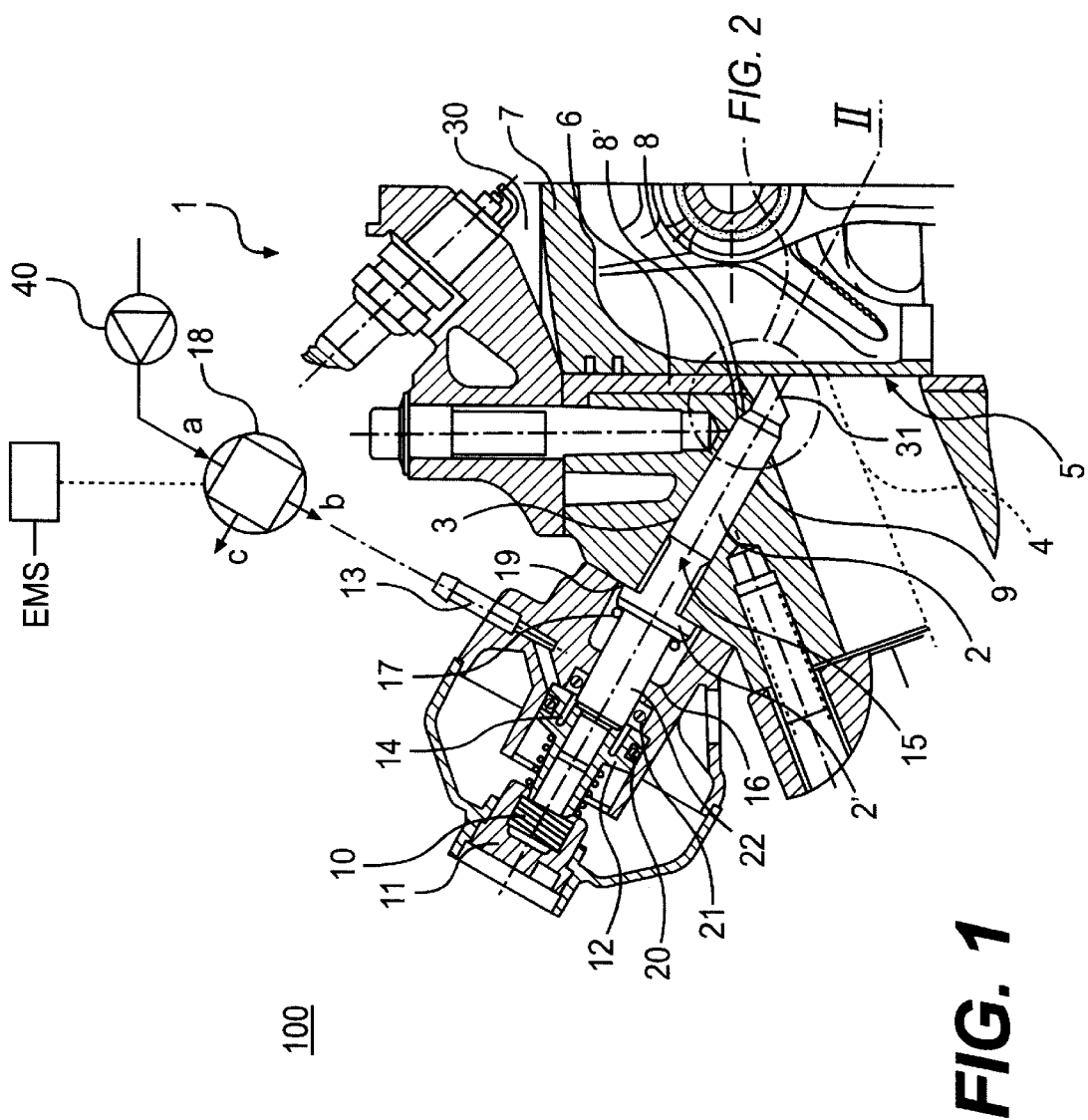
FIG. 1 is a cross-sectional view of a portion of a cylinder of a two-cycle internal combustion engine having a control assembly for exhaust time control in an advanced position in accordance with an embodiment of the present invention.

A portion of a two-cycle internal combustion engine 100 is illustrated in FIG. 1. The engine 100 includes a control assembly 1, which controls exhaust timing. In accordance with a first embodiment of the present invention, the control assembly 1 includes a control valve assembly 2. The control valve assembly 2 is preferably a control slide valve. The control valve assembly 2 has a flat plate-shaped end portion as shown in FIG. 2. The end portion is preferably angled. The control valve assembly 2 is slideably mounted in a guide channel 3 in the cylinder block of the engine 100. The control valve assembly 2 is also axially movable along the guide channel 3 and is shown in an extended or rest position in FIGS. 1 and 2.

In the rest position, the front end of the control valve assembly 2 extends into an exhaust channel 4 adjacent an exhaust port 5 provided in the cylinder housing 6, as shown in FIGS. 1 and 2. A piston assembly 7 is located within the cylinder housing 6 and is capable of reciprocating motion therein. The piston assembly 7 is shown in FIG. 1 in an uppermost position (0-position). During operation of the engine 100, exhaust gas which may contain incompletely burnt solid particles will flow into the exhaust channel 4 through the exhaust port 5 when the piston assembly 7 retracts to open the communication between the combustion chamber 30 and the exhaust channel 4.

In FIG. 1, the control valve assembly 2 is shown in its completely extended position. In this position, the forward beveled end portion 31 of the control valve assembly 2 covers a portion of the exhaust port 5. When the control valve assembly 2 is in the extended position, the effective height of the exhaust port 5 is reduced. This reduces the time the exhaust port 5 is open. When the control valve assembly 2 is in a retracted position, the effective height of the exhaust port 5 is unchanged. The entire cross section of the exhaust port 5 is exposed.

To prevent carbon particles and other solid particles from entering into the guide channel 3 between the wall 9 and the outer surface of the control valve assembly 2, a sealing arrangement. The sealing arrangement is formed by a chamfer or beveled edge 8 on the control valve assembly 2 and a complementary chamfer 8' on the guide channel 3. The complementary chamfer 8' is formed on one side of the guide channel 3. The control valve assembly 2 rests on the wall 9 on an opposite side of the guide channel 3. The guide channel 3 is preferably formed as a flat channel. The contact between the control valve assembly 2 and the wall 9 further prevents carbon particles and the like from entering the guide channel 3.

A spring assembly 10 is provided to bias the control valve assembly 2 into the extended position. The combination of the return force of the spring assembly 2 and the reaction force by the chamfer 8 of the control valve assembly 2 resting on the chamfer 8' of the guide channel 3 presses the control valve assembly 2 against the wall 9 of the guide channel 3. The contact between the wall 9 and the control valve assembly 8 and the chamfers 8 and 8' form a sealing arrangement to prevent carbon particles and other solid particles from entering into the guide channel 3. The pressure force of the spring 10 can be adjusted by means of an adjustment screw 11. The present invention, however, is not limited to the use of an adjustment screw; rather, it is contemplated that other means for adjusting the spring force of the spring assembly 10 are considered to be well within the scope of the present invention.

Although the preferred location of the chamfer 8' is shown in FIGS. 1 and 2, the present invention is not limited to this arrangement. It is contemplated that the chamfer 8' may be located within other portions of the guide channel 3. For example, the chamfer 8' may be formed on the wall 9. In this arrangement, the chamfers 8, 8' together with the force of spring 10 would press the control valve assembly 2 against a wall of the guide channel 3 opposite the wall 9.

In addition to providing a sealing arrangement, the contact between the control valve assembly 2 and the wall 9 forms a large heat transition area. Heat will effectively be conducted away from the control slide valve 2 to the cylinder block. The area of contact between the control valve assembly 2 and the wall 9 of the guide channel 3 may be a relatively large, thus particularly enhancing heat conduction away from the control valve assembly 2, or cooling thereof, respectively. This is important insofar as high control valve assembly temperatures aid the formation of oil carbon deposits or soot deposits, respectively, in the region of the guide channel 3.

The heat transition between the control valve assembly 2 and the guide channel 3 may be further increased if the area of contact is as smooth as possible to reduce friction. The smooth surfaces of the wall 9 and the control valve assembly 2 may be produced finish machining (e.g., fine milling and/or grinding). The present invention, however, is not limited to solely to the use of finish machining to produce the smooth surfaces; rather, it is contemplated that other means including the use of friction reducing coatings on either the wall 9 or the control valve assembly 2 are considered to be well within the scope of the present invention.

The operation of the control valve assembly 2 will now be described. The control valve assembly 2 may be moved between the extended position, shown in FIG. 1, and a retracted position wherein the control valve assembly 2 does not extend into the exhaust channel 4 using compressed air. Compressed air is supplied to a pneumatic piston 12 via a supply channel 13. The compressed air enters a cavity 14 of the pneumatic piston 12. In response, the volume of the cavity 14 expands and causes a force to act on the control valve assembly 2 against the bias of the spring assembly 10 so as to shift the control valve assembly 2 in direction of arrow 15 into its retracted position (not illustrated). Sealing elements 20 and 21 are provided on the pneumatic piston 12 and on the slide valve shaft 22 to seal the cavity 14, when pressurized.

When the control valve assembly 2 is in the extended position, deposits 24 of carbon and other solid particles may form on the exposed end portion of the control valve assembly 2 in the wedge-like space 23 formed by the front end of the control valve assembly 2, the chamfer 8' in the housing, and the cylinder housing 6, as shown in FIG. 2. The deposits 24 in this region are particularly unsuitable since they will dry due to the hot exhaust gases and thus harden, which would be very likely to cause the control valve assembly 2 to stick. The deposits 24 are removed or scraped off at each actuation of the control valve assembly 2 (i.e. when the control valve assembly 2 is retracted from its advanced position), through contact with the edge surface 25 at the entry of the guide channel 3 into the exhaust channel 5. In this manner, the system practically is self-cleaning. To overcome the forces caused by this scraping action and any friction between the control valve assembly 2 and the wall 9 during this retraction movement, the compressed air is supplied at a relatively high pressure. The compressed air preferably is supplied from the combustion air compressor 40. In this manner, relatively high actuation pressures (4–6 bar) can be attained. The combustion air compressor 40 may be of conventional construction.

The compressed air from the combustion air compressor 40 advantageously has a substantially higher pressure than the gases which so far have been taken from the crankcase or from the exhaust pipe system, as discussed in the prior art. Due to the higher pressure difference occurring when taking the compressed air from the combustion air compressor it is possible in an advantageous manner to apply pressure forces on a pneumatic piston 12 connected with the control valve assembly 2 instead of pressurizing a prior art membrane. Such a piston 12 has a comparatively higher strength and useful life.

The stroke movement of the control valve assembly 2 is limited by a stop 16, as shown in FIG. 1. An enlarged portion 2' of the control valve assembly 2 abuts the stop 2 when the control valve assembly 2 is in a fully retracted position. An elastomer ring 17 allows for a gentle abutment of the control valve assembly 2 against the stop 16. The present invention, however, is not limited to the elastomeric ring 16; rather, it is contemplated that other suitable means (e.g. a spring assembly) for permitting a gentle abutment of the control valve assembly 2 against the stop 16 may be used and are considered to be within the scope of the present invention.

The supply of compressed air is controlled through the operation of a switch valve 18 (e.g. 3/2-way valve) by an engine management system EMS. The engine management system EMS operates selectively opens and closes the switch valve 18 at predetermined engine operating conditions. When the engine management system operates the switch valve 18 such that it is in an open position, the compressed air flows from the combustion air compressor 40 through the switch valve 18 (from a to b, as shown in FIG. 1) to the cavity 14, which pressurizes the pneumatic piston 12. When the engine management system operates the switch valve 18 such that it is in a closed position, the compressed air located within the cavity 14 is vented through the switch valve 18 (from b to c, as shown in FIG. 1). The compressed air is vented from the cavity 14 under the force of the spring assembly 10.

Simultaneously, the force of the spring assembly 10 acts on the piston 12 to move the control valve assembly 2 into the extended position. The forward axial movement of the control valve assembly 2 is limited when the chamfer 8 contacts the chamfer 8', which also functions as a stop in addition to providing a sealing arrangement. A second stop 19 is provided on the outer (rear) side of the engine block. Close dimensional tolerances between the second stop 19 and the chamfer 8' must be maintained in order to insure that the chamfer 8 and 8' are in contact when the enlarged portion 2' contacts the second stop 19.

Figure 3:
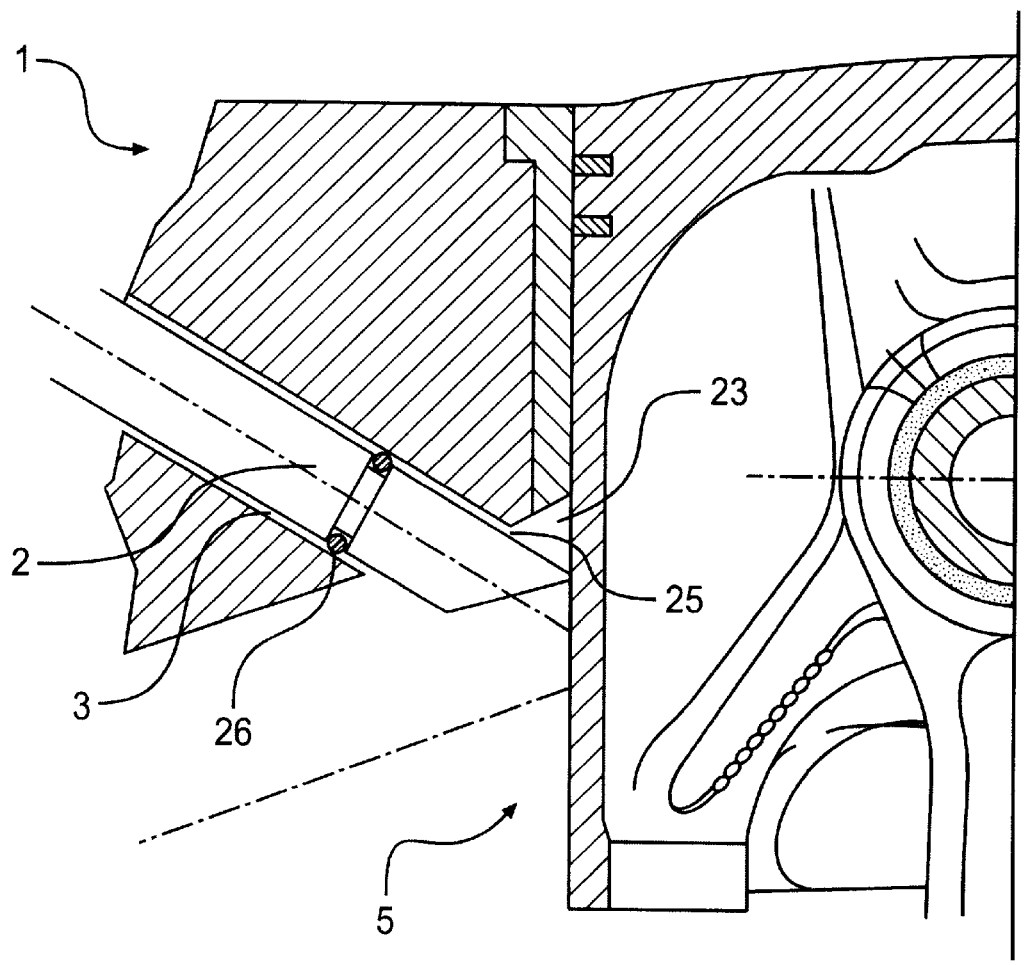
FIG. 3 is a cross-sectional view of the end of the control assembly according to another embodiment of the present invention.

While this invention has been described in conjunction with a specific embodiment thereof, it is evident that many alternatives, modifications and variations are considered to be well within the scope of the present invention. For example, a modified control valve assembly 2 is illustrated in FIG. 3. In this modified control valve assembly 2, the chamfers 8 and 8' have been replaced with a gasket 26, which seals the guide channel 3 to prevent particles from entering the guide channel 3. It is further contemplated that the gasket 26 may be used in combination with the chamfers 8 and 8'.

Figure 4:
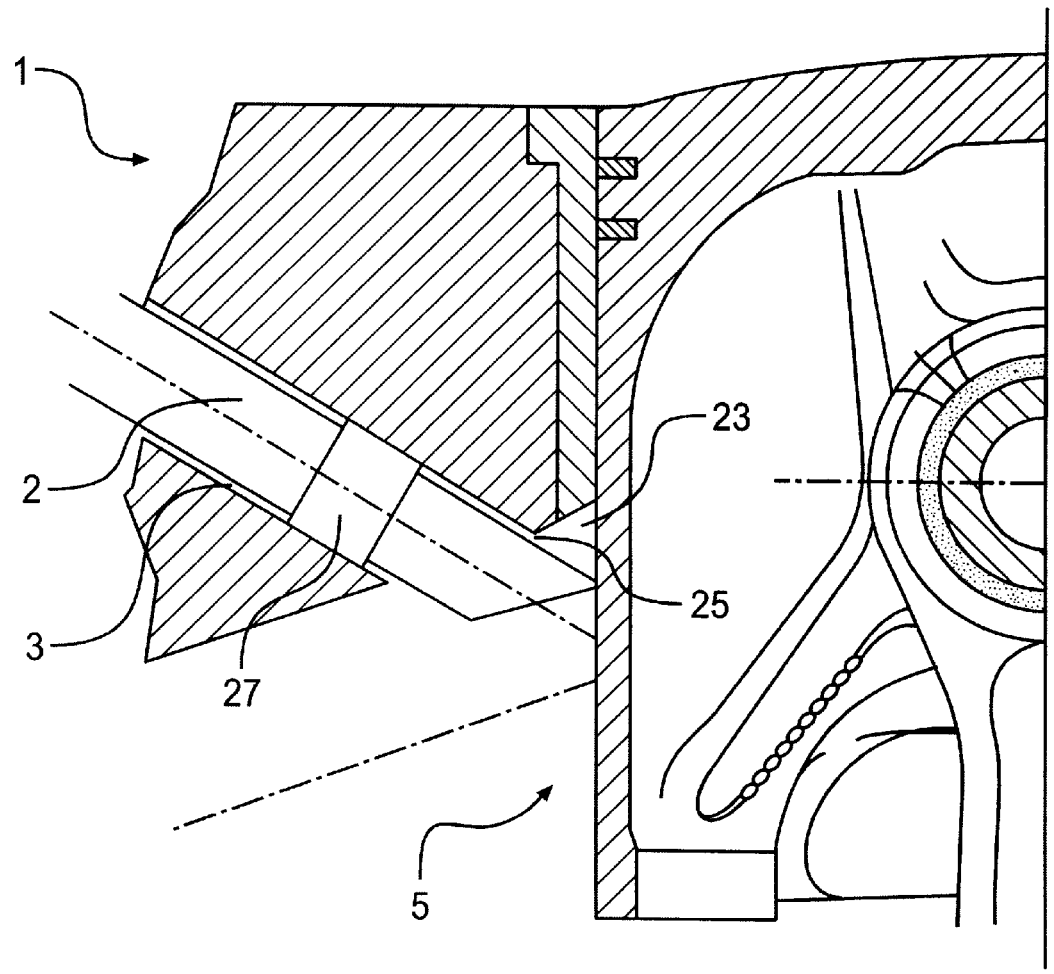
FIG. 4 is a cross-sectional view of the end of the control assembly according to another embodiment of the present invention.

Another variation of the control valve assembly 2 is shown in FIG. 4. In this modified control valve assembly 2, the control valve assembly 2 has a thickened region 27, which forms a tight fit between the control valve assembly 2 and the guide channel 3. This tight fit acts as seal to prevent particles from entering into guide channel 3. It is further contemplated that the thickened region 27 may be used in combination with the gasket 26 and/or the chamfers 8 and 8'.

In this case, the fit may be dimensioned such that a movement of the control valve assembly 2 in the guide channel 3 is possible without any resistance worthy of mention, whereas, however, particles cannot penetrate between the control valve assembly 2 and the guide channel 3.

Figure 5:
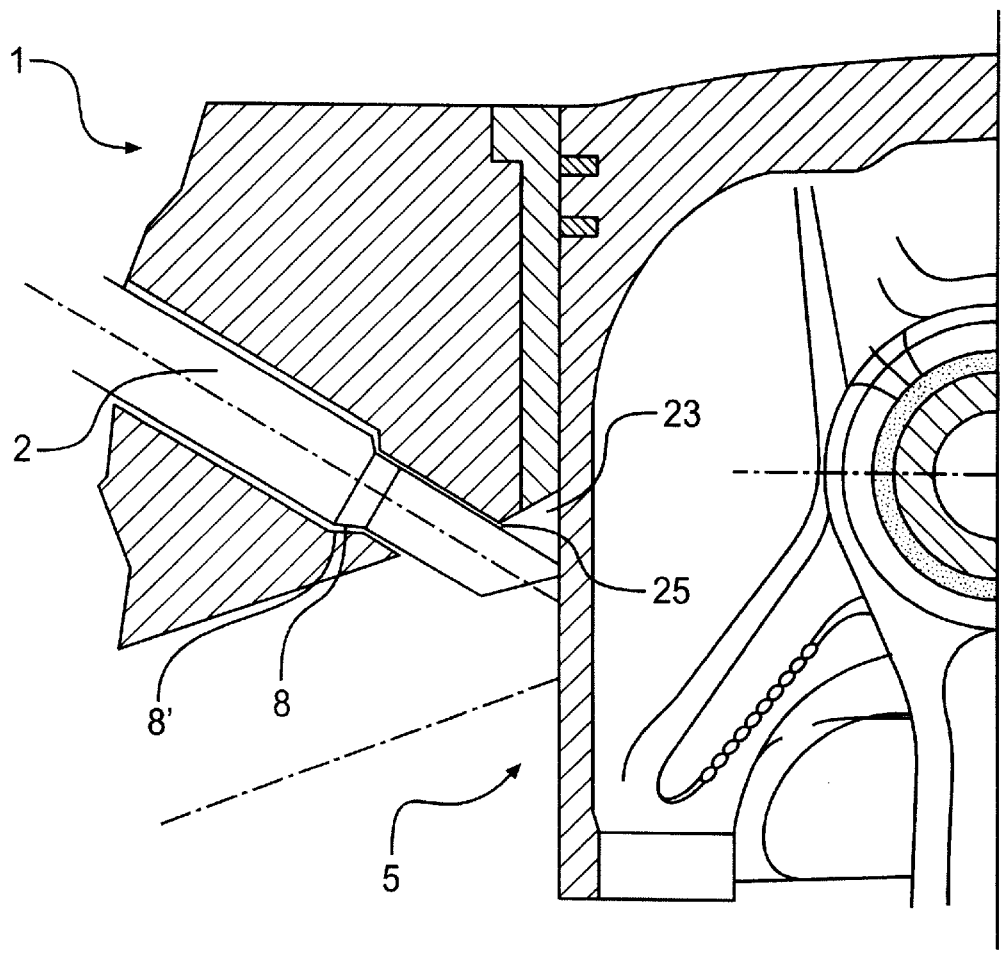
FIG. 5 is a cross-sectional view of the end of the control assembly according to another embodiment of the present invention.

Another variation of the control valve assembly 2 is shown in FIG. 5. In this modified control valve assembly 2, the chamfer 8 engages a complementary chamfer 8' located on both side of the guide channel 3. It is contemplated that the chamfer 8' extends about the inner diameter of the guide channel 3.

In each of these arrangements, any deposits 24 that form on the control valve assembly 2 when in an extended position are removed by the edge surface 2, as described above.

This application is intended to cover any variations, uses, equivalent arrangements or adaptations of the invention following, in general, the principles of the invention and including such departures from the present disclosure as come within known or customary practice in the art to which the invention pertains, and as may be applied to the essential features herein before set forth and followed in the spirit and scope of the appended claims and their equivalents.

What is claimed is:

1. A control assembly for exhaust timing control a two-cycle internal combustion engine, the two-cycle internal combustion engine having a housing, and at least one cylinder having an exhaust port with an effective height, wherein the exhaust port is in communication with an exhaust channel, the control assembly comprising:
    a guide channel formed in the housing of the internal combustion engine;
    a control valve assembly movable within the guide channel between a retracted position and an extended position, whereby the control valve assembly modifies the effective height of the exhaust port when in the extended position;
    an operating assembly for moving the control valve assembly within the guide channel between the retracted position and the extended position; and
    a sealing arrangement between the control valve assembly and the guide channel, wherein the sealing arrangement is located on at least one of the control valve assembly and the guide channel, wherein the sealing arrangement comprises at least one gasket, wherein the at least one gasket provides a seal between the control valve assembly and the guide channel.

2. The control assembly according to claim 1, wherein the control valve assembly reduces the effective height of the exhaust port when in the extended position.

3. The control assembly according to claim 1, wherein the at least one gasket is located on a portion of the control valve assembly adjacent the exhaust port.

4. The control assembly according to claim 1, further comprising:
    a first stop to limit the movement of the control valve assembly when in the retracted position; and
    a second stop to limit the movement of the control valve assembly when in the extended position.

5. The control assembly according to claim 4, wherein the first stop is formed the operating assembly.

6. The control assembly according to claim 4, wherein the second stop is formed on at least one of the control valve assembly and the guide channel.

7. The control assembly according to claim 1, wherein the operating assembly includes a spring assembly for biasing the control valve assembly into the extended position.

8. The control assembly according to claim 1, wherein the operating assembly comprises:
    a selectively operable piston assembly for moving the control valve assembly from the extended position to the retracted position against the bias of the spring assembly;
    a selectively operable supply of compressed air for operating the piston assembly; and
    an engine management system for selectively operating the supply of compressed air.

9. The control assembly according to claim 1, further comprising:
    a particle removal assembly that removes particle deposits from an extended portion of the control valve assembly as the control valve assembly moves from the extended position to the retracted position.

10. The control assembly according to claim 9, wherein the particle removal assembly includes an edge surface on the guide channel, wherein the edge surface removes the particle deposits as the deposits contact the edge surface as the control valve assembly moves from extended position to the retracted position.

11. A control assembly for exhaust timing control in a two-cycle internal combustion engine, the two-cycle internal combustion engine having a housing, and at least one cylinder having an exhaust port with an effective height, wherein the exhaust port is in communication with an exhaust channel, the control assembly comprising:
    a guide channel formed in the housing of the internal combustion engine;
    a control valve assembly movable within the guide channel between a retracted position and an extended position, whereby the control valve assembly modifies the effective height of the exhaust port when in the extended position;
    an operating assembly for moving the control valve assembly within the guide channel between the retracted position and the extended position; and
    a sealing arrangement between the control valve assembly and the guide channel, wherein the sealing arrangement comprises:
        a chamfer formed in the control valve assembly; and
        a complementary chamfer formed in at least a portion of the guide channel, wherein the chamfer is adapted to sealingly engage the complementary chamfer when the control valve assembly is in the extended position.

12. The control assembly according to claim 11, wherein the sealing arrangement further comprises:
    a first sealing surface on the control valve assembly; and
    a second sealing surface on the guide channel opposite the first sealing surface, wherein the first sealing surface is pressed against the second sealing surface when the chamfer contacts the complementary chamfer.

13. The control assembly according to claim 12, wherein the operating assembly supplies a force to press the first sealing surface against the second sealing surface.

14. The control assembly according to claim 11, wherein the chamfer is formed on opposite sides of the control valve assembly and the complementary chamfer is formed on opposite sides of the guide channel.

15. The control assembly according to claim 11, wherein the control valve assembly reduces the effective height of the exhaust port when in the extended position.

16. The control assembly according to claim 11, further comprising:

a first stop to limit the movement of the control valve assembly when in the retracted position; and a second stop to limit the movement of the control valve assembly when in the extended position.

17. The control assembly according to claim 16, wherein the first stop is formed in the operating assembly.

18. The control assembly according to claim 16, wherein the second stop is formed on at least one of the engine housing and the guide channel.

19. The control assembly according to claim 1, wherein the operating assembly includes a spring assembly for biasing the control valve assembly into the extended position.

20. The control assembly according to claim 19, wherein the operating assembly comprises:
   a selectively operable piston assembly for moving the control valve assembly from the extended position to the retracted position against the bias of the spring assembly;
   a selectively operable supply of compressed air for operating the piston assembly; and
   an engine management system for selectively operating the supply of compressed air.

21. The control assembly according to claim 1, further comprising:
   a particle removal assembly that removes particle deposits from an extended portion of the control valve assembly as the control valve assembly moves from the extended position to the retracted position.

22. The control assembly according to claim 21, wherein the particle removal assembly includes an edge surface on the guide channel, wherein the edge surface removes the particle deposits as the deposits contact the edge surface as the control valve assembly moves from extended position to the retracted position.

23. A control assembly for exhaust timing control in a two-cycle internal combustion engine, the two-cycle internal combustion engine having a housing, and at least one cylinder having an exhaust port with an effective height, wherein the exhaust port is in communication with an exhaust channel, the control assembly comprising:
   a guide channel formed in the housing of the internal combustion engine;
   a control valve assembly movable within the guide channel between a retracted position and an extended position, whereby the control valve assembly modifies the effective height of the exhaust port when in the extended position;
   an operating assembly for moving the control valve assembly within the guide channel between the retracted position and the extended position; and
   a sealing arrangement between the control valve assembly and the guide channel, wherein the sealing arrangement comprises an area of contact between the control valve assembly and the guide channel, the area of contact being formed by a sealing portion of the control valve assembly having increased thickness, whereby an area of reduced clearance is formed between the control valve assembly and the guide channel.

24. The control assembly according to claim 23, wherein the control valve assembly reduces the effective height of the exhaust port when in the extended position, wherein the control valve assembly extends into the exhaust channel adjacent the exhaust port when in the extended position.

25. The control assembly according to claim 23, further comprising:
   a first stop to limit the movement of the control valve assembly when in the retracted position; and
   a second stop to limit the movement of the control valve assembly when in the extended position.

26. The control assembly according to claim 23, wherein the operating assembly includes a spring assembly for biasing the control valve assembly into the extended position.

27. The control assembly according to claim 26, wherein the operating assembly comprises:
   a selectively operable piston assembly for moving the control valve assembly from the extended position to the retracted position against the bias of the spring assembly;
   a selectively operable supply of compressed air for operating the piston assembly; and
   an engine management system for selectively operating the supply of compressed air.

28. The control assembly according to claim 23, further comprising:
   a particle removal assembly that removes particle deposits from an extended portion of the control valve assembly as the control valve assembly moves from the extended position to the retracted position.

29. The control assembly according to claim 28, wherein the particle removal assembly includes an edge surface on the guide channel, wherein the edge surface removes the particle deposits as the deposits contact the edge surface as the control valve assembly moves from extended position to the retracted position.

30. In a two-stroke fuel injected internal combustion engine having a housing, and at least one cylinder having an exhaust port with an effective height, wherein the exhaust port is in communication with an exhaust channel, the improvement comprising:
   a control assembly for exhaust timing control, wherein the control assembly comprises:
   a guide channel formed in the housing of the internal combustion engine;
   a control valve assembly movable within the guide channel between a retracted position and an extended position whereby at least a portion of the control valve assembly is located within the exhaust port, whereby the control valve assembly modifies the effective height of the exhaust port when in the extended position, wherein particle deposits may form on the control valve assembly and in an open area in the exhaust port adjacent to the control valve assembly when the control valve assembly is in an extended position;
   an operating assembly for moving the control valve assembly within the guide channel between the redacted position and the extended position; and
   a particle removal assembly that removes particle deposits from an extended portion of the control valve assembly as the control valve assembly moves from the extended position to the retracted position, wherein the particle removal assembly includes an edge surface on the guide channel, wherein the edge surface removes the particle deposits as the deposits contact the edge surface as the control valve assembly moves from extended position to the retracted position.

31. The internal combustion engine according to claim 30, wherein the two stroke fuel injected internal combustion engine includes direct fuel injection.

32. A control assembly for exhaust timing control in a two-cycle internal combustion engine, the two-cycle internal combustion engine having a housing, and at least one cylinder having an exhaust port with an effective height, wherein the exhaust port is in communication with an exhaust channel, the control assembly comprising:

a guide channel formed in the housing of the internal combustion engine;

a control valve assembly movable within the guide channel between a retracted position and an extended position whereby at least a portion of the control valve assembly is located within die exhaust port, whereby the control valve assembly modifies the effective height of the exhaust port when in the extended position, wherein particle deposits may form on the control valve assembly and in an open area in the exhaust port adjacent to the control valve assembly when the control valve assembly is in an extended position;

an operating assembly for moving the control valve assembly within the guide channel between the extracted position and the extended position; and a particle removal assembly that removes particle deposits from an extended portion of the control valve assembly as the control valve assembly moves from the extended position to the retracted position, wherein the particle removal assembly includes an edge surface on the guide channel, wherein the edge surface removes the particle deposits as the deposits contact the edge surface as the control valve assembly moves from extended position to the retracted position.

33. The control assembly according to claim 32 wherein the control valve assembly reduces the effective height of the exhaust port when in the extended position, wherein the control valve assembly extends into the exhaust channel adjacent the exhaust port when in the extended position.

34. The control assembly according to claim 32, wherein the particle removal assembly includes an edge surface on the guide channel, wherein the edge surface removes the particle deposits as the deposits contact the edge surface as the control valve assembly moves from extended position to the retracted position.

35. The control assembly according to claim 32, further comprising:

a sealing arrangement between the control valve assembly and the guide channel.

36. The control assembly according to claim 35, wherein the sealing arrangement comprises at least one gasket located on the control valve assembly, wherein the at least one gasket provides a seal between the control valve assembly and the guide channel.

37. The control assembly according to claim 35, wherein the sealing arrangement comprises:

a chamfer formed in the control valve assembly; and a complementary chamfer formed in at least a portion of the guide channel, wherein the chamfer is adapted to sealingly engage the complementary chamfer when the control valve assembly is in the extended position.

38. The control assembly according to claim 37, wherein the sealing arrangement further comprises:

a first sealing surface on the control valve assembly; and a second sealing surface on the guide channel opposite the first sealing surface, wherein the first sealing surface is pressed against the second sealing surface when the chamfer contacts the complementary chamfer.

39. The control assembly according to claim 38, wherein the operating assembly supplies a force to press the first sealing surface against the second sealing surface.

40. The control assembly according to claim 35, wherein the sealing arrangement comprises an area of contact between the control valve assembly and the guide channel.

41. The control assembly according to claim 32, further comprising:

a first stop to limit the movement of the control valve assembly when in the retracted position; and a second stop to limit the movement of the control valve assembly when in the extended position.

42. The control assembly according to claim 32 wherein the operating assembly includes a spring assembly for biasing the control valve assembly into the extended position.

43. The control assembly according to claim 32, wherein the operating assembly comprises:

a selectively operable piston assembly for moving the control valve assembly from the extended position to the retracted position against the bias of the spring assembly;

a selectively operable supply of compressed air for operating the piston assembly; and an engine management system for selectively operating the supply of compressed air.

* * * * *